(12) United States Patent
Hollenbeck

(10) Patent No.: US 7,463,966 B2
(45) Date of Patent: Dec. 9, 2008

(54) ENGINE POWER STORAGE DEVICE AND METHOD

(75) Inventor: Bruce Phelps Hollenbeck, Orefield, PA (US)

(73) Assignee: Mack Trucks, Inc., Allentown, PA (US)

(*) Notice: Subject to any disclaimer, the term of this patent is extended or adjusted under 35 U.S.C. 154(b) by 311 days.

(21) Appl. No.: 10/587,081

(22) PCT Filed: Jan. 24, 2005

(86) PCT No.: PCT/US2005/002104

§ 371 (c)(1), (2), (4) Date: Jul. 21, 2006

(87) PCT Pub. No.: WO2005/072291

PCT Pub. Date: Aug. 11, 2005

(65) Prior Publication Data

US 2008/0243353 A1    Oct. 2, 2008

Related U.S. Application Data

(60) Provisional application No. 60/537,890, filed on Jan. 22, 2004.

(51) Int. Cl.
G06F 19/00 (2006.01)
(52) U.S. Cl. ...................................... 701/102
(58) Field of Classification Search .............. 701/102, 701/101, 115
See application file for complete search history.

(56) References Cited

U.S. PATENT DOCUMENTS 5,469,816 A    11/1995    Murakawa et al.
6,757,145 B2 *  6/2004    Takagi ..................... 361/93.1

* cited by examiner

Primary Examiner—Hieu T Vo
(74) Attorney, Agent, or Firm—Martin Farrell

(57) ABSTRACT

A power storage device is provided for a motor vehicle. An engine control unit (ECU) is configured to receive measurements of one or more engine and/or vehicle conditions and to determine an amount of unused engine power based upon the measurements and upon a nominal power rating of the engine when the engine is operated below the nominal power rating. The value of the amount of unused engine power is stored in memory as stored power.

31 Claims, 4 Drawing Sheets

_US 7,463,966 B2_

ENGINE POWER STORAGE DEVICE AND METHOD

RELATED APPLICATION DATA

This application is a National Phase of International Application Serial No. PCT/US2005/002104, filed 24 Jan. 2005, which claims priority of U.S. Provisional Application Ser. No. 60/537,890, filed 22 Jan. 2004.

BACKGROUND OF THE INVENTION

1. Field of the Invention

The present invention is generally directed to systems and methods for controlling a combustion engine. More particularly, the present invention is related to systems and methods for controlling a combustion engine used by a motor vehicle to optimize engine power usage over an engine duty cycle.

2. Description of the Related Art

Combustion engines are designed based upon a "duty cycle," which can take into account the intended use of the engine—e.g., commercial trucking, racing, and recreation. For example, commercial motor vehicles such as trucks are designed for durability. A "mission profile" may be used to define what the engine is required to accomplish over its life. Commercial truck engines may be expected to log one or two million miles during its life. By contrast, a drag racing engine producing 3000 horsepower (hp) may have a life expectancy of just a few races or less.

In commercial trucking, customers frequently purchase more horsepower than necessary to satisfy part time needs. For example, extra power may be needed part time for hilly terrain, for acceleration, or for larger loads. While it takes merely 150 hp to pull a 40-ton load on flat terrain with no headwind, approximately 700 hp is required to tow the same load up a 6% grade.

Manufactures design and build engines with more horsepower than required because of the need to design for average operating conditions and not for specific operating conditions. As a result, there is the disadvantage that engines may include more expensive components than generally required, and engines may be heavier than normal and cost more.

Thus, there is a need for new and improved systems and methods for managing power in a combustion engine.

SUMMARY OF THE INVENTION

In accordance with an embodiment of the present invention, a system and method for engine power storage are provided. The system and method include a means or step for calculating an unused engine capacity based on engine and/or vehicle conditions. By calculating an unused engine capacity, the engine may be operated at a higher output horsepower for periods of time without effecting the durability of the engine According to an embodiment of the present invention, an engine power storage device includes an engine control unit (ECU) coupled with a plurality of sensors that perform diagnostic measurements of various systems of a combustion engine and vehicle. The ECU is configured to calculate an unused engine capacity based upon the diagnostic measurements.

The system may also include a power storage meter for displaying the amount of unused capacity. The system may further include a means for increasing power output of the engine. The plurality of sensors may monitor one or more of engine load, engine fuel flow, engine air intake flow, vehicle speed, engine speed, or other conditions bearing a relation to engine capacity and engine damage.

According to an embodiment of the present invention, a method is provided for calculating an unused portion of engine capacity. The method may include a step of measuring one or more engine or vehicle conditions and a step of calculating, based on the one or more conditions measured, the unused portion of engine capacity. The unused portion may be displayed to the user of the motor vehicle. A means for increasing the engine output can be provided to the user of the motor vehicle.

According to an embodiment of the present invention, a power storage device is provided for a motor vehicle. An engine control unit (ECU) is configured to receive measurements of one or more engine and vehicle conditions and to determine an amount of unused engine power based upon the measurements and upon a nominal power rating of the engine when the engine is operated below the nominal power rating. The value of the amount of unused engine power is stored in memory as stored power.

Further applications and advantages of various embodiments of the present invention are discussed below with reference to the drawing figures.

DETAILED DESCRIPTION OF THE PREFERRED EMBODIMENTS

Variable strains and loads on an engine can damage the engine, and over time, add up to "cumulative damage," meaning that the fatigue life of the engine is "used up" during its expected life. A duty cycle may be defined for an engine based on predicted average usage and a "mission profile." However, actual usage often differs from the predicted usage. Therefore, a novel system and method for engine power storage are provided that take advantage of unused engine capacity.

Figure 1A:
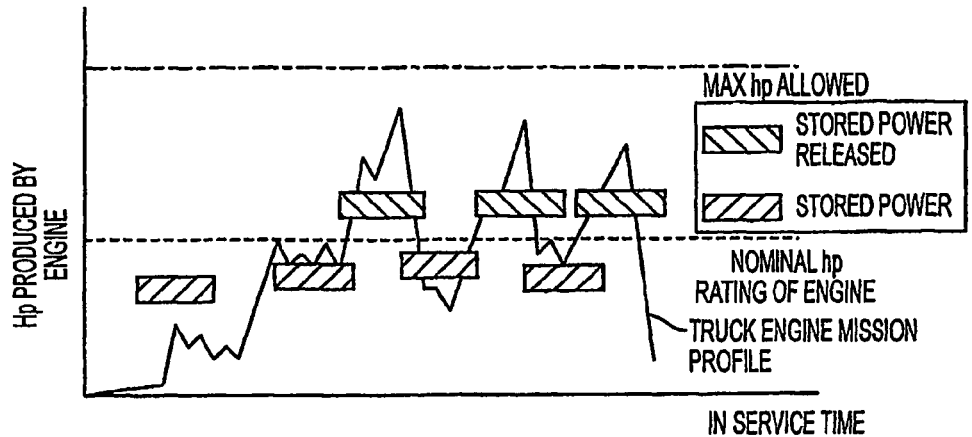
FIGS. 1A and 1B are graphs of horsepower output versus vehicle service time from an engine having a power storage device of the present invention and from a conventional engine, respectively.
Figure 1B:
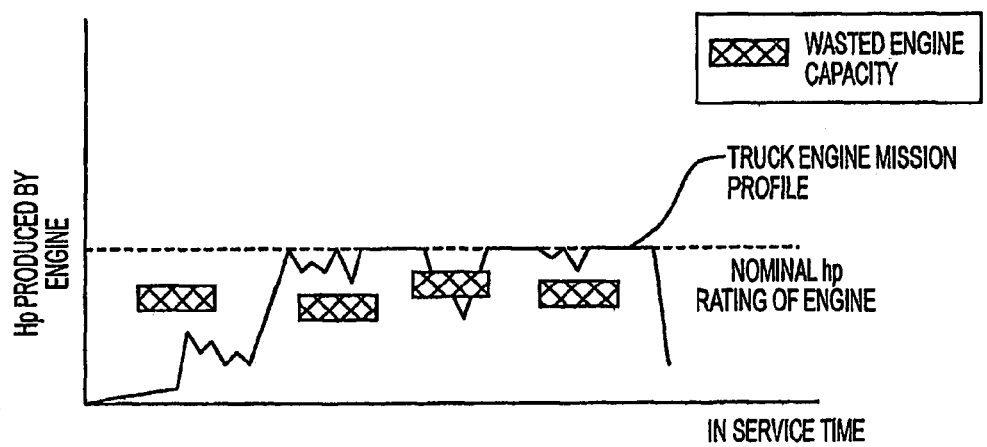

A graph of power output by an engine in a commercial vehicle (e.g., truck) versus service time is shown in FIG. 1B for an exemplary, arbitrary usage. The dotted line marks the truck engine nominal horse power rating and the bold line is the engine mission profile. The engine's duty cycle is defined based upon this amount of nominal hp output for a certain period of time, for example, for one million miles. However, during typical usage, the engine is not operated continuously at its nominal power rating. As shown, the power output of the engine can vary based on terrain, load, traffic, etc., but cannot be more than the nominal hp rating of the engine.

The nominal hp rating is shown as being constant for illustrative purposes. However, one skilled in the art will understand that the nominal hp rating of a combustion engine varies based upon the engine speed within the engine operating range.

Periods when the engine is operated below its nominal power rating are "wasted" engine capacity, which are shown by the checkered boxes. That is, the engine is designed for a predetermined duty cycle, however, it is not operated at nominal power continuously over the life of the engine and therefore, the engine has been damaged less than expected. The decreased damage to the engine can be quantified as unused engine power or capacity. Since the engine cannot be operated above the nominal hp rating, there is no way to take advantage of the stored power during regular usage.

With the present invention, portions of unused engine capacity may be summed over time to determine the amount of total or accumulated stored power. The engine may then be operated at an increased power output equivalent to the total stored power without shortening the life of the engine. Operating at higher than nominal output releases the stored power and the amount is referred to as "released" power.

A graph of power output by an engine in a commercial vehicle (e.g., truck) versus service time is shown in FIG. 1A for an exemplary, arbitrary usage according to the present invention. The lower dotted line marks the truck engine nominal hp rating, the upper dotted line shows the maximum power output. The solid line is the truck engine mission profile.

Stored engine power is shown on the graph where the curve goes below the nominal power output. By operating the engine at an increased power output level higher than the nominal power rating, stored power may be released. The released power is shown on the graph where the curve goes above the nominal power rating of the engine. By quantifying the stored power and the released power, the engine may be operated at high power output level when needed, without shortening the life of the engine.

Figure 2:
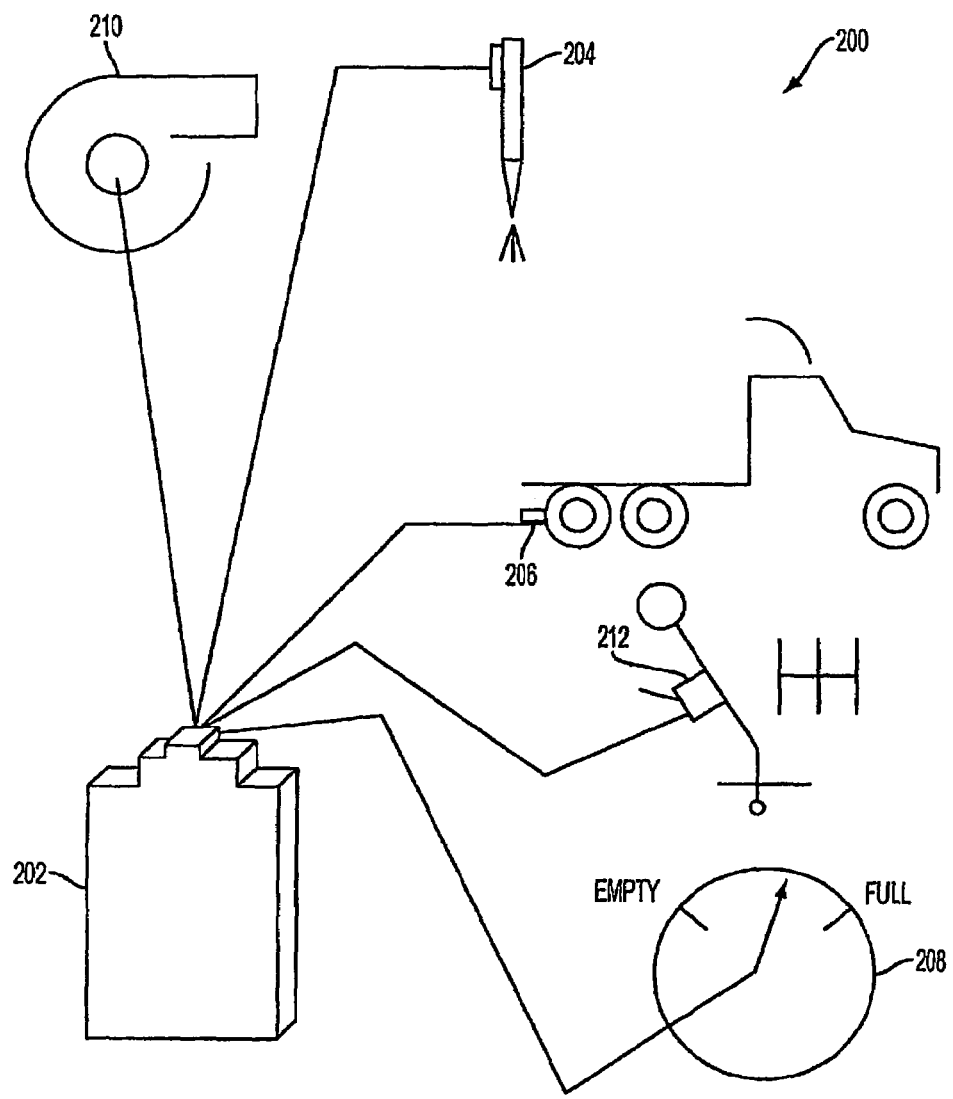
FIG. 2 is a block diagram of a power storage system according to an embodiment of the present invention.

FIG. 2 is a block diagram of a power storage system according to an embodiment of the present invention. The system 200 includes an ECU 202 coupled with a plurality of sensors that measure various engine and vehicle conditions. As an example, a sensor 204 measures fuel flow and sensor 206 measures vehicle speed. Each sensor transmits the measurements to the ECU 202. One having ordinary skill will understand that a variety of other sensors could be used with the present invention, such as sensors to measure air intake flow, oil temperature, engine speed, engine load, engine output torque, etc.

ECU 202 may include processor and memory units and may be configured to monitor any number of engine and vehicle conditions, such as via the sensors 204-206. Accordingly, ECU may be configured with appropriate hardware, software and/or firmware for performing the functions described herein. ECU 202 is configured to calculate unused engine capacity (stored power) from measured or sensed engine and vehicle conditions and to release the power when called for, either automatically or by operator command.

ECU 202 may also be coupled with a gauge or other display device 208. The calculated amount of stored power can be stored in memory and also may be displayed to an operator of the vehicle, such as on the vehicle dashboard or the like with display device 208.

The vehicle engine can be outfitted with a means for providing increased power over the nominal horsepower rating of the engine. For example, a turbo charger 210 may be provided. The turbo charger 210 may be controlled such that the power output of the engine only exceeds the nominal rating of the engine when stored power exists. For example, ECU 202 can increase fuel flow to the engine and air flow supplied by turbo charger 210 to increase power output of the engine. ECU 202 can determine an amount of stored power released based on engine and vehicle operating conditions over time. The amount of accumulated stored power is reduced by subtracting the amount of stored power released there from. The amount of stored power may be calculated and updated in real-time or on intervals.

A control means or switch 212 may be coupled with the ECU 202 provided in the vehicle so that the operator of the vehicle can manually initiate and terminate increase power output of the engine. Accordingly, the vehicle operator may recognize from the display 208 when and how much stored power exists and initiate increased power output on an as needed basis. For example, after traveling downhill in a truck having the present invention, the driver may recognize that a sufficient amount of stored power exists to operate the engine at increased power while traveling up a following hill. The operator may manually initiate operation of the engine at increased power at the base of the hill and then terminate operation of the engine at increased power when the summit is reached.

The vehicle operator will learn by experience when and for how long stored power may be used, how much power is released during certain circumstances, etc. Other conditions where a truck operator may desire to release stored power include passing, where quick acceleration is necessary, or when a truck is towing a larger than normal load.

Of course, this process may be automated as well. For example, ECU 202 may be configured to initiate operation of the engine at increase power output when the engine load is high, such as during a full throttle event, only when stored power exists.

The additional torque supplied may cause driveline damage. Therefore, the ECU 202 may monitor vehicle operating conditions and prevent operating the engine at increase power output (i.e., release of stored power) beyond rated capacity of the driveline components (e.g., transmission and rear axle(s)).

Engine diagnostic systems are well known, and many conventional instruments are available for use with the present invention. The use of an ECU in automotive vehicles is also well known, and one skilled the art will readily understand how to configure or program an ECU to operate in accordance with the present invention after reviewing this patent disclosure. The provision of an ECU to perform the functions of the present invention is not meant to be limiting, however, and one skilled in the art will understand that other arrangements and configurations could be utilized to achieve the present invention.

Figure 3:
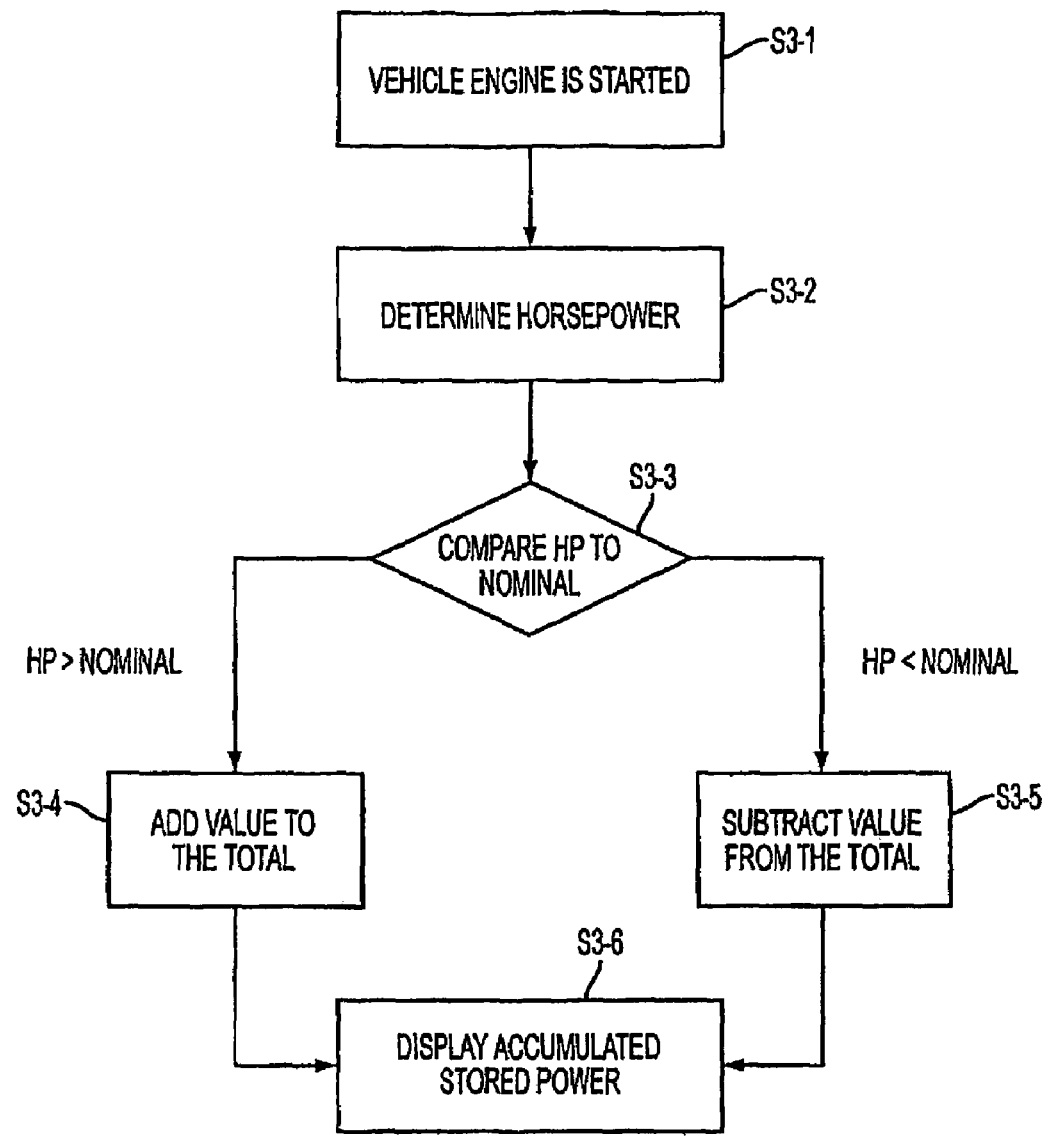
FIG. 3 is a flow chart of power storage method according to an embodiment of the present invention.

FIG. 3 is a flow chart of an exemplary method for calculating stored power according to an embodiment of the present invention. At step S3-1, the engine is started in a vehicle outfitted with a power storage device. During engine operation and vehicle use, a number of parameters may be monitored, such as engine speed, oil temperature, etc. The amount of fuel metered to the engine can be obtained from a Fuel Map stored in the engine ECU (Electronic Control Unit). A histogram of fuel flow/engine speed conditions can be stored in the engine ECU for a prescribed interval.

From this information, at step S3-2, the instantaneous horsepower of the engine can be calculated and accumulated, and stored in memory. Engine damage may also be calculated and stored.

At step S3-3, the amount of horsepower output may be compared to the nominal horsepower rating of the engine to calculate a stored power (for power output below nominal) or a released power (for power output above nominal). The total stored power is accumulated over time, and this amount is stored in memory. Accordingly, when stored power is calculated, the value is added to the value in memory (S3-4), and when released power is calculated, that value is subtracted from the value in memory (S3-5).

At step S3-6, the amount of accumulated stored power can be displayed to the operator of the vehicle, such as by a gauge on the dashboard, a trip computer, or another display device. The display may indicate a value or simply indicate that stored power exists or does not exist. A value indication is preferable because it will allow an operator to make a better decision whether to initiate increased power output.

Figure 4:
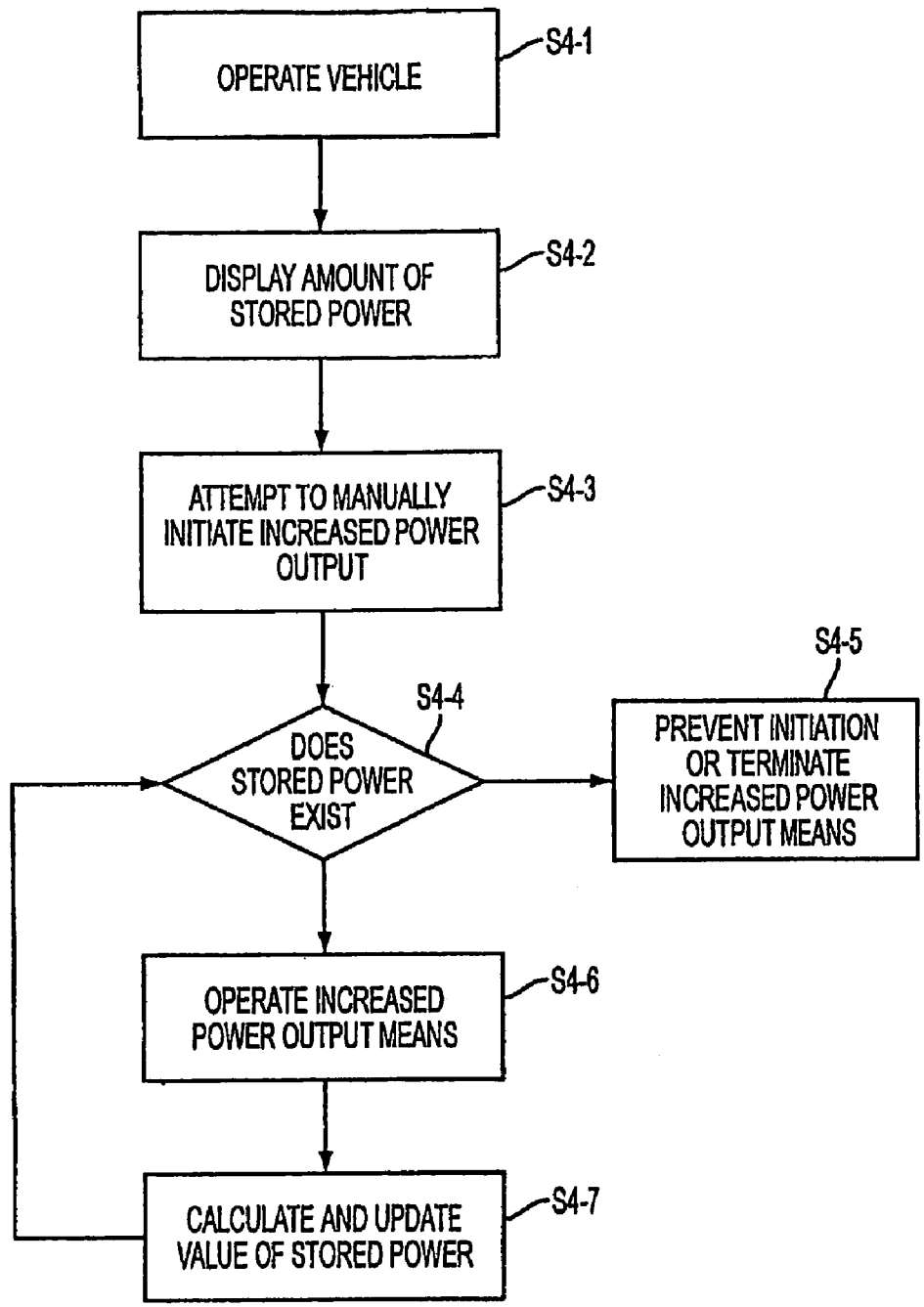
FIG. 4 is a flow chart of operation of a vehicle having a storage power device according to an embodiment of the present invention.

FIG. 4 is a flow chart of a method of operating a vehicle according to an embodiment of the present invention. At step S4-1, a vehicle having a stored power system is operated normally. Assuming that conditions allow the operation of the vehicle at a power output below nominal, stored power may be calculated. If stored power is calculated, it is displayed to the operator of the vehicle at step S4-2.

Should the operator of the vehicle desired to initiate increased power output (S4-3), it is first checked whether sufficient stored power exists (S4-4). If sufficient stored power does not exist, initiation is prevented (S4-5). Otherwise, the engine is operated at an increased power at step (S4-6), such as, for example, by initiation of a turbo-charger.

Stored power or released power may be continuously calculated, updated and displayed (S4-7). After recalculation, it is checked again whether sufficient stored power exists (S4-4). If stored power is depleted, then operation at increased power is terminated. Otherwise, operation of the engine at an increased power is continued.

FIG. 4 is merely a simplified example of operating a vehicle according to an embodiment of the present invention and is not meant to limit the present invention. One skilled in the art will readily recognize that the steps shown could be performed in a different order or more or less steps may be implemented. For example, initiation of increased power could automated based on the load and the amount of stored power.

The present invention has been described above in the context of a motor vehicle. However, the present invention may also be applicable to stationary internal combustion engines. In such systems, engine speed of a stationary engine is fixed, however, the load can vary depending upon the work being performed. As the load is lowered, the present invention could be used to determine the unused capacity of the stationary engine and store the value, just as described above. Then, as the load is increased, if unused capacity had been determined, the engine could be controlled to operate at an increased power output (i.e., above nominal) until the unused capacity is exceeded.

Thus, a number of preferred embodiments have been fully described above with reference to the drawing figures. Although the invention has been described based upon these preferred embodiments, it would be apparent to those of skilled in the art that certain modifications, variations, and alternative constructions would be apparent, while remaining within the spirit and scope of the invention.

I claim:

1. A device for utilizing stored power in a combustion engine, comprising:
    an engine control unit (ECU) configured to receive measurements of one or more engine conditions and to calculate an amount of unused engine power based upon said measurements and on a nominal power rating of the engine when the engine is operated below said nominal power rating, and to store the calculated value of said amount of unused engine power in memory as data representing unused engine power.

2. The device as recited by claim 1, wherein:
    said engine conditions may include one or more of air intake flow, engine speed, engine load, fuel flow and engine output torque.

3. The device as recited by claim 1, wherein:
    said ECU is further configured to prohibit operation of the engine at an output power greater than said nominal power rating unless said ECU determines that the value of the amount of unused engine power is greater than zero.

4. The device as recited in claim 1, wherein:
    said ECU is further configured to calculate an amount of released power based upon said measurements and said nominal power rating when the engine is operated above said nominal power rating, and to update said value of unused engine power data stored in memory by subtracting the value of said amount of released power from said value of unused engine power data.

5. The device as recited in claim 1, wherein said ECU is further configured to display said value of unused engine power data on a display device in said vehicle.

6. The device as recited in claim 1, further comprising:
    a control means that allows the vehicle operator to initiate and terminate operation of the engine at an increased power output above the nominal power output of the engine.

7. The device as recited in claim 6 wherein the engine includes a turbo charger and a fuel injection unit that when initiated allows the engine to operate above the nominal power output of the engine, wherein
    said control means allows the operator to control operation of the turbo charger and fuel injection unit to operate the engine at an increased power output above the nominal power output of the engine.

8. The device as recited by claim 1, wherein said engine is used in a motor vehicle and said ECU is further configured to receive measurements of one or more vehicle conditions and to calculate the amount of unused engine power based upon said measurements of one or more engine and vehicle conditions.

9. The device as recited by claim 8, wherein:
    said engine conditions may include one or more of air intake flow, engine speed, engine load, fuel flow and engine output torque.

10. The device as recited in claim 8, wherein said ECU is further configured to display said amount of unused engine power on a display device within said vehicle.

11. The device as recited in claim 8, further comprising:
    a control means that allows an operator of the vehicle to initiate and terminate operation of the engine at an increased power output above the nominal power output of the engine.

12. The device as recited in claim 11 wherein the engine includes a turbo charger and a fuel injection unit when initiated allows the engine to operate above the nominal power output of the engine, wherein
    said control means allows the vehicle operator to control operation of the turbo charger and fuel injection unit to operate the engine at an increased power output above the nominal power output of the engine.

13. A device for utilizing stored power in a combustion engine, comprising:
    sensing means for measuring one or more engine or vehicle conditions; and
    processor means for receiving measurements from said sensing means, calculating an amount of unused engine power based upon said measurements and storing the value of said amount of unused engine power as stored power data.

14. A device as recited by claim 13, wherein said conditions may include one or more of air intake flow, engine speed, engine load, fuel flow and engine output torque.

15. A device as recited by claim 13, wherein said processing means prohibits operation of the engine at an output power greater than a nominal power rating unless the value of stored power data is greater than zero.

16. The device as recited in claim 13, wherein said processor means calculates an amount of released stored power based upon said measurements and said nominal power rating when the engine is operated above said nominal power rating, and updates said value of stored power data in memory by subtracting the value of said amount of released power from said value of stored power data.

17. The device as recited in claim 13, further comprising display means for indicating the amount of unused power, wherein said processor means causes said value of stored power data to be displayed with said display means.

18. The device as recited in claim 13, further comprising control means that allows initiation and termination of operation at an increased power output of the engine above the nominal power output of the engine.

19. The device as recited in claim 18 wherein operation of the engine at an increased power output above the nominal power output of the engine is prevented unless the value of stored power data is greater than zero.

20. The device as recited in claim 18, wherein initiation of said increased power means is prevented unless the value of stored power data is greater than zero.

21. The device as recited in claim 18, wherein said increased power means is terminated when the value of stored power data is less than or equal to zero.

22. The device as recited in claim 13 wherein the engine includes an increased power means for allowing the engine to operate above the nominal power output of the engine, said device further comprising control means that allows initiation and termination said increased power means.

23. A method for utilizing stored power of a combustion engine, said method comprising steps of:
  measuring at least one engine parameter of said combustion engine;
  calculating an amount of unused engine power based upon the at least one engine parameter measured;
  storing the value of the calculated amount of unused power in a memory; and
  providing an indication of an accumulated amount of unused power to an operator of the engine based on the amount of unused power stored in the memory in the storing step.

24. The method as recited by claim 23, wherein said parameters may include one or more of air intake flow, engine speed, engine load, fuel flow and engine output torque.

25. The method as recited by claim 23, further comprising a step of allowing operation of the engine at an output power greater than a nominal power rating when the value of unused power in the memory is less than or equal to zero.

26. The method as recited by claim 25, wherein said calculating step includes calculating an amount of released stored power based upon the measurements and a nominal power rating of the engine when the engine is operated above the nominal power rating, and the storing step includes updating the value of the calculated amount of unused power in memory by subtracting the value of the amount of released power therefrom.

27. The method as recited by claim 23, wherein said combustion engine is in a vehicle and the providing step includes displaying the amount of unused engine power on a display device in the vehicle where said display device can be viewed by an operator of the vehicle.

28. The method as recited by claim 23, further comprising a control means that allows initiation and termination of operation of said engine at an increased power output above the nominal power output of the engine.

29. The method as recited by claim 23, wherein the engine includes an increased power means for allowing the engine to operate above the nominal power output of the engine, said method further comprising a step of providing a means for initiating and terminating said increased power means.

30. The method as recited by claim 23, wherein said calculating step includes calculating an amount of power produced by the engine based upon the measurements in said measuring step and taking the difference between the amount of power produced and a nominal power rating of the engine for a specified time period, wherein when the amount of power produced is less than the nominal power rating, an amount of unused power is the resulting difference, and when the amount of power produced is greater than the nominal power rating, an amount of released power is the resulting difference; and
  said storing step includes adding the value of unused power to an accumulated value and subtracting the value of released power from the accumulated value.

31. The method as recited by claim 23, wherein said engine is used in a vehicle, and wherein said measuring step includes measuring at least one vehicle condition.

\* \* \* \* \*